US007574524B2

(12) United States Patent
Bantz et al.

(10) Patent No.: US 7,574,524 B2
(45) Date of Patent: Aug. 11, 2009

(54) METHOD AND SYSTEM FOR ON-DEMAND ALLOCATION OF A DYNAMIC NETWORK OF SERVICES

(75) Inventors: David F. Bantz, Portland, ME (US); David M. Chess, Mohegan Lake, NY (US); Christos J. Georgiou, Scarsdale, NY (US); Jeffrey O. Kephart, Cortlandt Manor, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 920 days.

(21) Appl. No.: 10/674,962

(22) Filed: Sep. 30, 2003

(65) Prior Publication Data

US 2005/0091364 A1 Apr. 28, 2005

(51) Int. Cl.
*G06F 15/173* (2006.01)
*G06F 15/16* (2006.01)

(52) U.S. Cl. .................. 709/238; 709/239; 709/242; 709/224; 709/225; 709/226; 709/228

(58) Field of Classification Search ............... 709/238, 709/239
See application file for complete search history.

(56) References Cited

U.S. PATENT DOCUMENTS

| 6,078,960 | A  | * | 6/2000 | Ballard ............... 709/229 |
| 6,101,182 | A  | * | 8/2000 | Sistanizadeh et al. ....... 370/352 |
| 6,587,831 | B1 | * | 7/2003 | O'Brien ..................... 705/8 |
| 7,149,778 | B1 | * | 12/2006 | Patel et al. .................. 709/206 |
| 2002/0046099 | A1 | * | 4/2002 | Frengut et al. ................ 705/14 |
| 2002/0147810 | A1 | * | 10/2002 | Traversat et al. ............. 709/224 |
| 2003/0036921 | A1 | * | 2/2003 | Ito et al. ....................... 705/1 |
| 2003/0167339 | A1 | * | 9/2003 | Zhu et al. ..................... 709/238 |
| 2005/0102415 | A1 | * | 5/2005 | Ishiyama et al. ............. 709/238 |

OTHER PUBLICATIONS

Norton et al. "Internet Service Provider and Peering"; internet draft "http://morse.colorado.edu/~epperson/courses/routing-protocols/handouts/InternetServiceProvidersandPeering2.4.pdf"; 2001.*

* cited by examiner

*Primary Examiner*—Patrice Winder
*Assistant Examiner*—Lin Liu
(74) *Attorney, Agent, or Firm*—Scully, Scott, Murphy & Presser, P.C.; Brian Verminski, Esq.

(57) ABSTRACT

A system and method for providing real-time, dynamic switching between first and second service providers each capable of providing a service for users over a communications network. The method includes steps of: establishing switching criterion for deciding when to switch service provision between the first service provider and second service provider; maintaining state information associated with a user's use of the service provided by a first service provider; switching between the first and second service provided over the communications network based on satisfaction of the switching criterion; and, migrating any state information maintained up to the time of switching to the second service. Preferably, the dynamic switching occurs in a manner substantially transparent to the user.

27 Claims, 2 Drawing Sheets

METHOD AND SYSTEM FOR ON-DEMAND ALLOCATION OF A DYNAMIC NETWORK OF SERVICES

BACKGROUND OF THE INVENTION

1. Field of the Invention

The present invention relates to the field of network services generally, including services typically pertaining to and available via the Internet, and particularly, to novel switching services implemented in a wired or wireless communications network.

2. Description of the Prior Art

Users of services, such as an Internet Service Provider (ISP) or Web services, may sometimes experience an interruption in service or a degradation of service for a variety of reasons. For instance, lack of suitable bandwidth may be a cause of service degradation. Other reasons may include, for instance, an onslaught of SPAM, which may hog a network resource, or excess demand which may overload the ISP server devices.

It would be highly desirable to provide a system and method that enables automatic switching of a provided network service to another service, based on certain criteria.

SUMMARY OF THE INVENTION

According to one aspect of the invention, a system and method is provided for performing real-time switching of network services, in particular, by providing a "switch provider service element" that automatically switches from one service to another, based on some criteria.

According to another aspect of the invention, a system and method is provided for performing real-time switching of network services, in particular, by providing a "switch provider service element" that automatically switches from one service to another, based on some criteria, and then determines the fees associated with the switching based on some other criteria.

In particular, the term "service" may refer to any Internet or other network service; or any service that provides text, audio, images, broadcasts, instructions, financial information such as stock prices, recipes, functions for a computer, or sensory stimulation. The service may be provided in a peer-to-peer system (e.g. file sharing of photos, music) or may include gaming and adult entertainment services.

Preferably, the service may be provided as a Web service in accordance with standard protocols including, but not limited to the following, SOAP, UDDI and WSDL.

Thus, according to a preferred aspect of the invention, there is provided a system and method for providing real-time, dynamic switching between first and second service providers each capable of providing a service for users over a communications network. The method includes steps of: establishing switching criterion for deciding when to switch service provision between the first service provider and second service provider; maintaining state information associated with a user's use of the service provided by a first service provider; switching between the first and second service provided over the communications network based on satisfaction of the switching criterion; and, migrating any state information maintained up to the time of switching to the second service. Preferably, the dynamic switching occurs in a manner substantially transparent to the user.

Advantageously, the service switching provider according to the invention may include a wide variety of service providers, including, but not limited to: a third party, the provider of the first service, the provider of the second service, the provider of both services, a software agent running on the user's computer, a service provider, a company, the government, a photo provider, music provider, image provider, an insurance agency, a health provider, an advertiser, a multimedia broadcaster or cable TV company, a game provider, etc.

BRIEF DESCRIPTION OF THE DRAWINGS

The objects, features and advantages of the present invention will become apparent to one skilled in the art, in view of the following detailed description taken in combination with the attached drawings, in which.

DETAILED DESCRIPTION OF THE PREFERRED EMBODIMENTS

Figure 1:
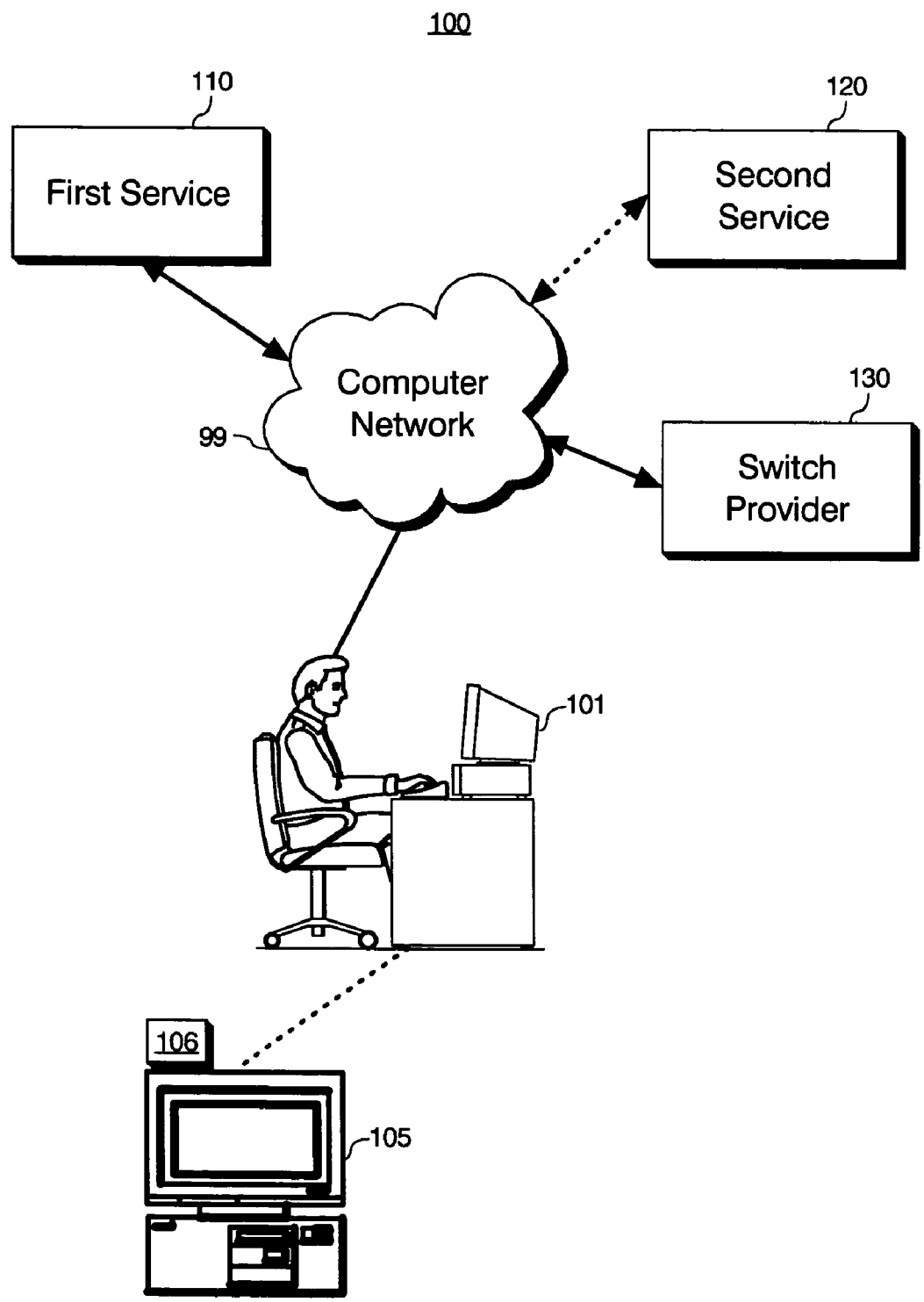
FIG. 1 illustrates a system that enables the automatic switching from a first service to a second service through the use of a switching provider according to the present invention; and, FIG. 2 illustrates a method according to the present invention for enabling the automatic switching according to the system depicted in FIG. 1.

As illustrated in FIG. 1, a system 100 is provided that enables the automatic switching from a first service 110, such as an ISP providing a service for a user 101 through a user computer terminal 105, to a second service 120 through the use of a switching provider 130 for a service provided over a computer network 99. For purposes of discussion, the network may include a wired or wireless communications network, and includes the Internet. The term "service" may refer to any Internet or other network service, or any service that provides text (e.g., an electronic book provider), audio/video or multimedia images or web-casts or broadcasts, instructions; financial information such as stock prices, recipes, functions for a computer (e.g., provision of software download services or subscription software), or sensory stimulation such as background images or environmental stimuli. The service may be provided in a peer-to-peer system (e.g. file sharing of photos, music) and may additionally include gaming and adult entertainment services.

Preferably, the service may be provided as a Web service in accordance with standard protocols including, but not limited to the following, SOAP, UDDI and WSDL. It is understood that Web services are a new programming model for the Web whose purpose is machine-to-machine communications. In particular, Web services are a technology that allows applications to communicate with each other in a platform- and programming language-independent manner. For instance, the Simple Object Access Protocol (SOAP) is a lightweight protocol for exchange of information in a decentralized, distributed environment. It is an XML based protocol that consists of three parts: an envelope that defines a framework for describing what is in a message and how to process it, a set of encoding rules for expressing instances of application-defined datatypes, and a convention for representing remote procedure calls and responses. SOAP can potentially be used in combination with a variety of other protocols. The Universal Description Discovery and Integration (UDDI) protocol defines a set of services supporting the description and discovery of (1) businesses, organizations, and other Web services providers, (2) the Web services they make available, and (3) the technical interfaces which may be used to access those services. Based on a common set of industry standards, including HTTP, XML, XML Schema, and SOAP, UDDI provides an interoperable, foundational infrastructure for a Web services-based software environment for both publicly available services and services only exposed internally within an organization. The Web Services Description Language (WSDL) is an XML format for describing network services as a set of endpoints operating on messages containing either document-oriented or procedure-oriented information. The operations and messages are described abstractly, and then bound to a concrete network protocol and message format to define an endpoint. Related concrete endpoints are combined into abstract endpoints (services). WSDL is extensible to allow description of endpoints and their messages regardless of what message formats or network protocols are used to communicate.

One key element of the system described herein is that the switching provider 130 may include but is not limited to, one of the following service providers: a third party, the provider of the first service, the provider of the second service, the provider of both services, a software agent running on the user's computer, a service provider, a company, the government, a photo provider, a music provider, an image provider, an insurance agency, a health care provider, an advertiser, a multimedia broadcaster or cable TV company, a game provider, etc. It is understood that the user may be an individual, or a group of individuals (for example, a company or governmental entity, e.g., a county or state).

One example implementation is as follows: assuming a user 101 is browsing the web using an Internet Service Provider (ISP) and the ISP suddenly fails to provide the service 110 in a timely fashion because the ISP's servers are overloaded. The invention implements various criteria to determine when a switching from that one service 110 to another 120 is appropriate, including: service 110 unavailable; service 110 degraded (e.g. bandwidth is low); cost of second service 120 is less than service 110; service 120 has fewer advertisements; service 120 is more secure; a bidding (auction) system for services; an assessment of potential/predicted relative liability; predicted reliability of service over a predetermined time period (e.g., the next N hours); relative ease of use for a plurality of providers (e.g. user experience) using service 120 versus service 110; relative cognitive load (e.g. language of material presented) for the services; and relative occurrence of SPAM. The switching service provider may be transparent to the user (not normally known) and completely independent of the first and second service providers, or may have a proactive presence, i.e., may be selectable (for a fee) by a user to detect conditions that would motivate a user to switch provider services.

As referred to herein, the term "cognitive load" indicates the mental load placed on a user in accordance with his/her experience with a service. A user can mentally process information presented to him/her depending on the form of the information, the quantity of the information, and the rate of the information. When too much information, too little information, and/or inappropriate information is presented to a user, the user's ability to understand and enjoy the information is hindered. If information is presented too slowly, too quickly, or in inappropriate forms, cognitive load can increase. So, for example, the switching may occur when the cognitive load is too high as may be the case when inappropriate or too many of the following are presented to the users: low contrast or garish colors, tiny fonts, missing fonts, foreign languages, bad English, strange vocabulary, overuse of animations, overuse of advertisements, confusing sounds, hard-to-follow page layouts, poor audio quality, poor video quality, high noise level, missing frames, broken links, and displeasing pop-up windows.

In another example, a computer program may have located and be bound to a first Web service and is using that service. The system and method of the invention includes monitoring the first Web service for compliance with a service-level agreement and may have found that the Web service is no longer in compliance. The program may then use the services of the switching provider 130 to locate and bind to a second Web service, and to replicate any state that the program has created in the first Web service to the second Web service. The switching provider has examined the service level guarantees of the second Web service and found them compatible with the program's needs. The switching provider can then terminate the program's agreement with the first service. This transparent switching eliminates the need for the program to incorporate the complex logic required to switch services during use.

As a third example, it is assumed that a service provider is providing a first service based on an implementation that has become obsolete, either because the implementation is more expensive than necessary to provide, or because a newer implementation could offer a wider range of options to its users and would thus represent an increased business opportunity. The service provider wishes to provide a transparent migration from the first service to the second for its customers, so it employs the services of the third-party switching provider 130 (FIG. 1) to achieve this goal. Alternately, it may invest in the software that the switching provider would use, achieving its goal of transparent switching utilizing in-house resources. In accordance with this scenario, it may be the case that an ISP, e.g., first service provider, may want a user to switch away from using their service and may with or without customer knowledge, initiate the switching of services to another provider.

Figure 2:
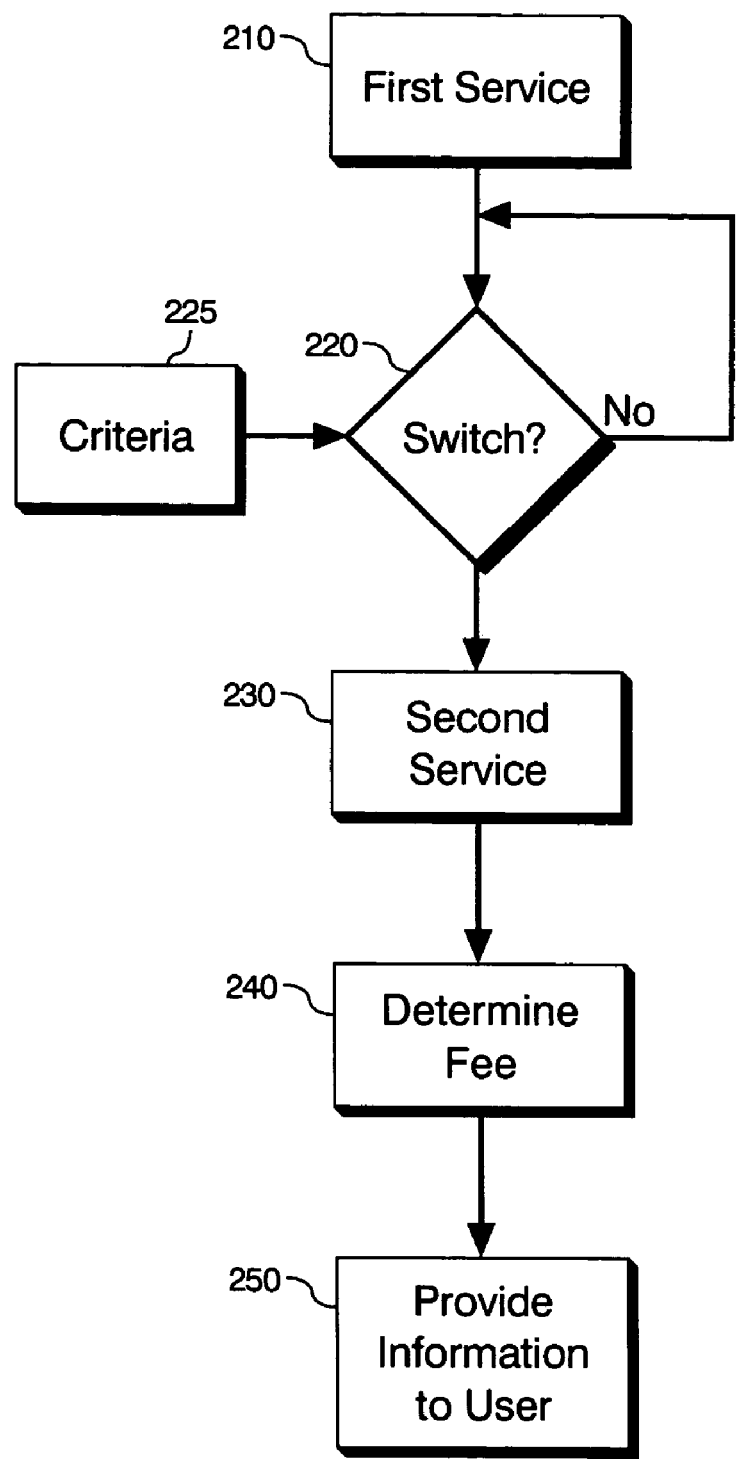

FIG. 2 is a flow chart depicting how such a switching provider service functions to provide automatic service switching. In step 210, a first service 110 is providing a service, such as the delivery of a broadcast over a communications network. In step 220, the switch provider 130 uses one or more criteria 225, such as an assessment of bandwidth determined by monitoring network speeds by methods known to those skilled in the art, and switches the service from service 1 (110) to service 2 (120). Once the switch to the second service is accomplished at step 230, the provider of the switch service 130 determines a fee for providing the switch service at step 240. This fee determination may be based on many factors including: the complexity of the switch service provided, e.g., the difficulty in accessing state information for perfecting the switch. For example, notification of a domain name may be the only thing that is necessary to be migrated to the second service, as opposed to a more complex change of state which may require e-mail addresses, calendars, access to a database, etc. for performing the state switching.

The user satisfaction level may be alternately determined automatically, for example by biometrics. For example, a user's clicking actions may reveal that the user is unsatisfied, i.e., when it is detected for instance, that a user keeps deleting SPAM mail, continuously closes pop-up advertisement windows, or must continuously re-fresh that user's browser—indicating that the user is dissatisfied. As a further example, referring back to FIG. 1, a web-enabled viewing device 106, such as a webcam, may be provided that enables the switching service to view a user's facial expressions which may reveal that user's emotional state correlating to a level of satisfaction/unsatisfaction.

The instrumentation required to monitor the quality of a provided service is dependent on the form of the service. In the description provided hereinabove, the instrumentation may assess the bandwidth required by the first service provider for provisioning the service to a user. For example, commercially available products such as the Bandwidth Meter available from CNET Networks, Inc. measures the information-carrying capacity, or available bandwidth, between a client and the server such as an Internet Services server. For example, given a connection speed between the client/server (e.g., from dial-up, cable modem or DSL link), the amount of time it takes for a file of predetermined size to be completely downloaded to the client will be reported to the Bandwidth Meter servers and communicated to the switch service provider 130. An automated means for assessing a service's compliance with a service-level agreement is additionally available, for example, by AlertSite (http://www.alertsite.com), which provides a Web site monitoring service so that the service level agreement for a Web site provided by a provider can be monitored for compliance. There are many such instrumentation means, particular to the form of service and applicable for a wide range of devices including Web Servers, Secure Web Servers, E-mail Servers, Business Transactions, DNS Servers, FTP Servers, Routers and Firewalls. Given appropriate instrumentation, the process of comparing actual performance to expected performance of these devices and determining whether to initiate a switch of service providers is straightforward and familiar to those skilled in the art.

Referring back to FIG. 2, because the switch provider 130 has some knowledge of the user of the system, it may be advantageous for the switch provider 130 to send at step 250 relevant promotional and informative material to the user, such as why the switch was made, when the switch took place, and various reminders related to different aspects of a user's life (e.g. reminders to pay a bill, to take a medicine, etc.).

The switching provider 130 may also send promotional material to the user (e.g. a pleasant photo of a Christmas tree on Christmas, an advertisement, a notification, news, pictures of people like movie stars, reminders to take medicine, reminders to pay a bill, or information relating to contracts). The switching provider may receive a fee from the user, and this fee may depend on the nature of information presented, amount of information presented, type of service, number of times switching is used, quality of service, or user satisfaction level.

A further example of a switch providing service is now described in the context of an e-mail service. For example, a user is using an e-mail function, and the switch provider 130 (e.g., either a remote third party service or a software agent running on the user's machine) determines that the user has received five (5) SPAM messages per hour. However, a similar user of another email function receives one (1) SPAM message per hour. Because the second service is superior in that the user receives less SPAM, the switch provider switches the e-mail function from one service to another or, alternately from using one SPAM filter to another SPAM filter. An example fee arrangement for the provision of this service is that the user pays a fixed amount, e.g., $10.00, for the use of the switch provider for one month if the SPAM is truly decreased. In this example, the switch provider 130 notifies the user that a second SPAM filter is being used and that the user should receive 20% less SPAM as a result of the switch.

As another example, a user communicates over a wireless network, and the switch provider 130 (e.g., either a remote third party service or a software agent running on the user's machine) determines that the wireless connection is insecure for the nature of the work the user is doing. A second service is available, such as alternative network connections (e.g., a wired connection) or a connection implementing data encryption. Additionally, this second service has fewer advertisements, is easier to use because of its superior graphics, is in Spanish, and is cheaper. Because the second service is superior in that the user is more secure and happier, the switch provider switches the network connection function from the first service to the second service. The user pays a fee, e.g., $10.00, for the use of the switch provider for one month. The switch provider notifies the user that the second services is more secure and reminds the user what steps might be taken in the future to enhance security.

In many instances, the switch provider 130 will need to have knowledge of various properties of the first service 110 and second service 120 (FIG. 1). For example, the mail server names for the second service may be needed before the switch in service can occur. This information may be obtained from service 2 or accessed from a database that resides in an area accessible over a network or, on the user's machine. In a preferred embodiment, the second service (Service 2 (120)) supports a Web Service from which the necessary properties may be obtained. Service 1 (110) may maintain some state information on behalf of the user and/or switch provider 130. For example, Service 1's mail server may contain mail for the user that has arrived for the user but has not been copied to the user's workstation. The switch provider 130 may facilitate the transfer of this state from service 1 to service 2. In the case that service 1 is inaccessible, the switch provider may queue a request to service 1 for the transfer of this state. Since both service 1 and service 2 are potential recipients of incremental revenue from the switch provider 130, both services are motivated to facilitate this state transfer. Alternatively, the switch provider 130 may maintain a copy of the user's state so as to facilitate the switch from service 1 to service 2. For example, the switch provider may maintain a shadow copy of the user's state such that the complete user's state can be reconstructed at the time of switch.

Although-this method and system focuses on the automatic switching of services, the switching may also take place at a user's manual request or at the request of a third party, such as a user's employer. For example, a user may select an icon on a computer display to initiate a service switch when the user is dissatisfied with some characteristic of service 1. For instance, service 1 may be too costly, too slow, present too many advertisements, exhibit negative or bad human factors, and so forth. A user or a company may wish a manual or automatic switch in order to migrate or upgrade to newer versions of software. Such a service switch may occur within a service provider or between service providers.

Alternately, the service switching may be determined according to a result of a bid process such as may be conducted in an auction system set-up the third party switching service, for example, where the auctioned item is for the provision of services. The service providers may bid for handling the requested service and the winning bidder, based on a criteria such as, lowest bid price, for example, may be the benefactor for providing the requested service to a user.

While the invention has been particularly shown and described with respect to illustrative and preformed embodiments thereof, it will be understood by those skilled in the art that the foregoing and other changes in form and details may be made therein without departing from the spirit and scope of the invention which should be limited only by the scope of the appended claims.

The invention claimed is:

1. A method implemented by a computing device for real-time dynamic switching between a first service provider providing a first Web-service for users via a program executing at a user's computer device over a communications network in accordance with a service level agreement between a user and said first service provider and a second service provider adapted for providing a second Web-based service for users at a user's computer device, said method comprising the steps of:

automatically monitoring said first Web-based service for determining compliance of service-level guarantees according to said service level agreement by said first service provider at said user's computer device, said monitoring including accessing internal functioning of said first Web-based service that is currently in use; and, upon determining non-compliance of said service-level guarantees, locating said second service provider for providing said second Web service according to service-level guarantees compatible with needs of said executing program;

maintaining state information that the program has created in the first Web service provided by said first service provider at said user's computer device;

terminating said service level agreement between said user and said first service provider; and switching provision of said second Web service to said user's computer device from said second service provider over said communications network; and, migrating said state information maintained up to the time of switching to said second Web service provided by said second service provider, said state information including state information maintained by said first web service provider on behalf of the user, wherein the switching occurs in a manner substantially transparent to the user, wherein a switching criterion for initiating said switching includes one or more selected from the group comprising: the relative prevalence of advertisements or SPAM, the relative usability of a user interface provided at computer device, the relative cost of the service provided by said second service provider as compared to a cost of the service provided by first service provider, a relative cognitive load of a user, and, a relative security of said service provided by said second service as compared to the service provided by first service provider.

2. The method of claim 1, further including the steps of:

establishing criterion for determining service fees to be charged by a switching service provider for providing said automatic switching; and, communicating fee information to said user.

3. The method of claim 1, wherein said switching is performed automatically without user knowledge.

4. The method of claim 1, wherein said switching is performed at behest of a user or, upon a user providing approval for the switch when a switching criterion is satisfied.

5. The method of claim 1, wherein said user includes: an individual, or a group of individuals.

6. The method of claim 1, wherein said service provided to said users over a communications network includes a service provisioning one or more of: text, multimedia content, images, broadcasts, recipes, functions for a computer, and sensory stimulations.

7. The method of claim 1, wherein the switching includes transfer of service properties.

8. The method of claim 1, wherein a service provided by the switching provider includes a Web service.

9. The method of claim 1, where a switching criterion includes one or more selected from the group comprising: said first service provider is unavailable; the service provided by first service provider is degraded.

10. The method of claim 1, where a switching criterion is determined based on a result of an auction system for providing said services.

11. The method of claim 1, where a switching criterion is determined based on a potential or predicted relative liability for providing said service.

12. The method of claim 1 where the switching provider comprises one selected from the group comprising: a third party, a provider of the first service, a provider of the second service, a provider of both services, a software agent running on the user's computer, a service provider, a company, the government, a video or image content provider, an audio content provider, an insurance agency, a health care provider, an advertiser, a multimedia broadcaster or cable TV company, a game provider.

13. The method of claim 1, further including the step of enabling said switching service provider to generate a fee for switching services, said fee being dependent upon any one or more of: nature of information presented, amount of information presented, type of service, number of times switching is used, quality of service, and user satisfaction level.

14. The method of claim 13, further including the step of determining a user satisfaction level according to biometrics obtained from and concerning the user.

15. The method of claim 1, where the switching service is provided in a peer-to-peer file sharing system.

16. A system for real-time dynamic switching between a first service provider providing a first Web-based service for users via a program executing at a user's computer device over a communications network in accordance with a service level agreement between a user and said first service provider and a second service provider adapted for providing a second Web-based service for users at a user's computer device, said system comprising:

a computer-implemented means for automatically monitoring said first Web-based service for determining compliance of service-level guarantees according to said service level agreement a switching criterion by said first service provider at said user's computer device, said monitoring means including accessing internal functioning of said first Web-based service that is currently in use; and, a computer-implemented means responsive to determining non-compliance of said service-level guarantees, for locating said second service provider for providing said second Web service according to service-level guarantees compatible with needs of said executing program, said means maintaining state information that the program has created in the first Web service provided by said first service provider at said user's computer device and terminating said service level agreement between said user and said first service provider; and, for switching provision of said second Web service to said user's computer device from said second service provider over said communications network and migrating said state information maintained up to the time of switching to said service provided by said second service provider, said state information including state information maintained by said first web service provider on behalf of the user, wherein the switching occurs in a manner substantially transparent to the user; and, wherein a switching criterion for initiating said switching includes one or more selected from the group comprising: the relative prevalence of advertisements or SPAM, the relative usability of a user interface provided at computer device, the relative cost of the service provided by said second service provider as compared to a cost of the service provided by first service provider, a relative cognitive Toad of a user, and, a relative security of said service provided by said second service as compared to the service provided by first service provider.

17. The system of claim 16, further comprising:
means for determining service fees to be charged by a switching service provider for providing said automatic switching; and,
means for communicating fee information to said user.

18. The system of claim 16, wherein said switching is performed automatically without user knowledge.

19. The system of claim 16, wherein said switching is performed at behest of a user or, upon a user providing approval for the switch when a switching criterion is satisfied.

20. The system of claim 16, wherein said user includes: an individual, or a group of individuals.

21. The system of claim 16, wherein said service provided to said users over a communications network includes a service for provisioning one or more of: text, multimedia content, images, broadcasts, recipes, functions for a computer, and sensory stimulations.

22. The system of claim 16, wherein the switching includes transfer of service properties.

23. The system of claim 16, wherein a service provided by the switching provider includes a Web service.

24. The system of claim 16, where a switching criterion includes one or more selected from the group comprising: said first service provider is unavailable; and, the service provided by first service provider is degraded.

25. The system of claim 16, wherein the switching provider comprises one selected from the group comprising: a third party, a provider of the first service, a provider of the second service, a provider of both services, a software agent running on the user's computer, a service provider, a company, the government, a video or image content provider, an audio content provider, an insurance agency, a health care provider, an advertiser, a multimedia broadcaster or cable TV company, a game provider.

26. The system of claim 16, further including the step of enabling said switching service provider to generate a fee for switching services, said fee being dependent upon any one or more of: nature of information presented, amount of information presented, type of service, number of times switching is used, quality of service, and user satisfaction level.

27. The system of claim 26, further including the step of: means for obtaining biometric information relating to a user satisfaction level, said system including determining a fee for services according to biometrics obtained concerning the user.

* * * * *